(12) United States Patent
Kanematsu

(10) Patent No.: US 10,594,877 B2
(45) Date of Patent: Mar. 17, 2020

(54) IMAGE PROCESSING APPARATUS, CONTROL METHOD THEREOF, AND STORAGE MEDIUM

(71) Applicant: CANON KABUSHIKI KAISHA, Tokyo (JP)

(72) Inventor: Shinichi Kanematsu, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/229,982

(22) Filed: Dec. 21, 2018

(65) Prior Publication Data
US 2019/0199862 A1 Jun. 27, 2019

(30) Foreign Application Priority Data
Dec. 27, 2017 (JP) .................................. 2017-252069

(51) Int. Cl.
*H04N 1/00* (2006.01)
*H04N 1/21* (2006.01)
(52) U.S. Cl.
CPC ....... *H04N 1/0009* (2013.01); *H04N 1/00037* (2013.01); *H04N 1/0097* (2013.01); *H04N 1/21* (2013.01)
(58) Field of Classification Search
CPC .. G06F 11/0733; G06F 11/0784; G06F 3/121; G06F 3/1229; G06F 3/1236; G06F 3/1288; H04L 41/0853; H04L 67/025; H04L 67/2828; H04N 1/00344; H04N 1/32122; H04N 2201/0082; H04N 2201/0093; H04N 2201/0094; H04N 2201/3202; H04N 2201/3204; H04N 2201/3212; H04N 2201/3274; H04N 2201/3278
USPC ................................................ 358/1.15, 1.16
See application file for complete search history.

(56) References Cited

U.S. PATENT DOCUMENTS

| | | | | |
|---|---|---|---|---|
| 2001/0028473 A1* | 10/2001 | Yamasaki | ........... | G06F 11/0709 358/1.15 |
| 2010/0177344 A1* | 7/2010 | Matsumoto | ........ | H04N 1/00344 358/1.15 |
| 2011/0199630 A1* | 8/2011 | Oozawa | ...................... | B41J 3/01 358/1.14 |
| 2011/0299109 A1* | 12/2011 | Kamisuwa | ......... | H04N 1/00244 358/1.14 |
| 2013/0100500 A1* | 4/2013 | Yuuichiroh | ............. | G06F 3/121 358/1.16 |

(Continued)

FOREIGN PATENT DOCUMENTS

JP 2012056230 A 3/2012

*Primary Examiner* — Negussie Worku
(74) *Attorney, Agent, or Firm* — Venable LLP

(57) ABSTRACT

The present invention directs to an image processing apparatus comprising: a plurality of units each holding individual operation logs; a memory device that stores a set of instructions; and at least one processor that executes the set of instructions to: detect an error that has occurred in the image processing apparatus; determine the type of the detected error; decide a unit which obtains operation logs from among the plurality of units and an order in which the operation logs are obtained, in accordance with the determined type of the error, and based on the decided unit and order, obtain the operation logs from the decided unit and store the operation logs in a non-volatile memory.

20 Claims, 8 Drawing Sheets

(56) References Cited

U.S. PATENT DOCUMENTS

| | | | |
|---|---|---|---|
| 2014/0136915 A1* | 5/2014 | Hyde | G06F 11/0703 714/747 |
| 2016/0142734 A1* | 5/2016 | Kim | G06T 9/004 375/240.12 |
| 2016/0227072 A1* | 8/2016 | Yoshikawa | H04N 1/00 |
| 2017/0041488 A1* | 2/2017 | Shibata | H04N 1/00344 |
| 2018/0091668 A1* | 3/2018 | Tanaka | H04N 1/00384 |
| 2018/0107438 A1* | 4/2018 | Takeuchi | G06F 3/1298 |
| 2018/0198956 A1* | 7/2018 | Kurahashi | H04N 1/4426 |

* cited by examiner

TARGET AND ORDER OF OPERATION LOG STORAGE IN CASE OF PRINTER ERROR

TARGET AND ORDER OF OPERATION LOG STORAGE IN CASE OF SCANNER ERROR

TARGET AND ORDER OF OPERATION LOG STORAGE IN CASE OF FAX COMMUNICATION ERROR

IMAGE PROCESSING APPARATUS, CONTROL METHOD THEREOF, AND STORAGE MEDIUM

BACKGROUND OF THE INVENTION

Field of the Invention

The present invention relates to an image processing apparatus including a plurality of units each holding individual operation logs, a control method thereof, and a storage medium.

Description of the Related Art

An image processing apparatus such as a multi-function peripheral (MFP) includes a plurality of units such as a printer unit, a scanner unit, a finisher unit, a FAX unit, and a controller unit. The printer unit is a unit that forms an image on a recording medium and outputs the printed recording medium. The scanner unit is a unit that scans an original document, converts an image into electronic data, and outputs the electronic data. The finisher unit is a unit that that is connected to the printer unit, and performs finishing processing on the printed paper. The FAX unit is a communication unit that is connected to a communication network, and performs facsimile communication. The controller unit is a unit that performs overall control on the units, and realizes operations of the overall system. Each unit includes control firmware in a non-volatile memory provided in the unit, and the function operation of each unit is realized by the CPU provided in the unit reading out the control firmware from the non-volatile memory and executing the control firmware.

Also, in order to investigate a firmware fault, it is desirable to output operation logs including firmware operation information and collect the operation logs as needed. For example, if an unexpected deactivation of one of the pieces of firmware included in the units is detected, the operation logs of the control firmware of each unit are automatically stored in the non-volatile memory. During normal operation, in order to maintain the operating speed, the operation logs of firmware are output to a buffer in a high-speed DRAM with a small capacity, and when a fault occurs, the operation logs are stored in the non-volatile memory from the DRAM. Then, the operation logs stored in the non-volatile memory are collected and used to investigate the firmware fault. The number of output operation logs of firmware tends to increase as the scale of the firmware increases, and the size of the operation logs tends to increase. For this reason, it is often the case that a finite DRAM and a fixed-sized buffer of the non-volatile memory are allocated as operation log storage areas, and control as a ring buffer is performed so as to overwrite and store operation logs that have exceeded the buffer size in chronological order.

Japanese Patent Laid-Open No. 2012-056230 proposes a technique in which if there is no free area in an operation log storage area of a non-volatile memory, priority between stored operation logs and operation logs to be stored is compared, and when the operation logs to be stored have the higher priority, the operation logs are written over the stored operation logs.

However, the conventional technology described above has the following problems. For example, in order to store the operation logs of all pieces of firmware in the image processing apparatus, it may take several minutes or more because there is a large number of different types of firmware, and depending on the unit, the communication speed with the controller is slow and it takes time to collect the operation logs. Also, when a fault occurs in a piece of firmware, along with the deactivation of the firmware, the operations and the display of an operation unit included in the image processing apparatus often stop. In such a case, it is common for a user of the image processing apparatus to turn off and turn on the power supply to the entire apparatus for recovery. Furthermore, a notification prompting the user to turn off and turn on the power supply to the entire image processing apparatus may be provided when an error screen indicating the occurrence of an error in firmware is displayed on the operation unit along with the deactivation of the firmware.

Accordingly, if the power supply to the image processing apparatus is turned off while operation log storage processing associated with the occurrence of an anomaly in firmware is being executed, storage of the operation log may not be performed in time, and the operation logs at the time when the fault occurred may be lost. Also, there is a problem in that the operation logs of the firmware of the unit that caused the error are needed to investigate the fault, but it takes time to store operation logs of other units that are irrelevant to the error, and if the power supply is turned off while the operation logs of the irrelevant units are being stored, the most important operation log is not stored in time.

SUMMARY OF THE INVENTION

The present invention enables realization of a configuration of suitably storing operation logs that are required to perform fault investigation in an image processing apparatus that includes a plurality of pieces of firmware.

One aspect of the present invention provides an image processing apparatus comprising: a plurality of units each holding individual operation logs; a memory device that stores a set of instructions; and at least one processor that executes the set of instructions to: detect an error that has occurred in the image processing apparatus; determine the type of the detected error; decide a unit which obtains operation logs from among the plurality of units and an order in which the operation logs are obtained, in accordance with the determined type of the error, and based on the decided unit and order, obtain the operation logs from the decided unit and store the operation logs in a non-volatile memory.

Another aspect of the present invention provides a control method for controlling an image processing apparatus including a plurality of units each holding individual operation logs, the control method comprising: detecting an error that has occurred in the image processing apparatus; determining the type of the detected error; deciding a unit which obtains operation logs from among the plurality of units and an order in which the operation logs are obtained, in accordance with the determined type of the error, and based on the decided unit and order, obtaining the operation logs from the decided unit and storing the operation logs in a non-volatile memory.

Still another aspect of the present invention provides a non-transitory computer-readable storage medium storing a computer program for causing a computer to execute the steps of a control method for controlling an image processing apparatus including a plurality of units each holding individual operation logs, the control method comprising: detecting an error that has occurred in the image processing apparatus; determining the type of the detected error; deciding a unit which obtains operation logs from among the plurality of units and an order in which the operation logs are obtained, in accordance with the determined type of the error, and based on the decided unit and order, obtaining the operation logs from the decided unit and storing the operation logs in a non-volatile memory.

Further features of the present invention will be apparent from the following description of exemplary embodiments with reference to the attached drawings.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Configuration of Image Processing Apparatus

Figure 1:
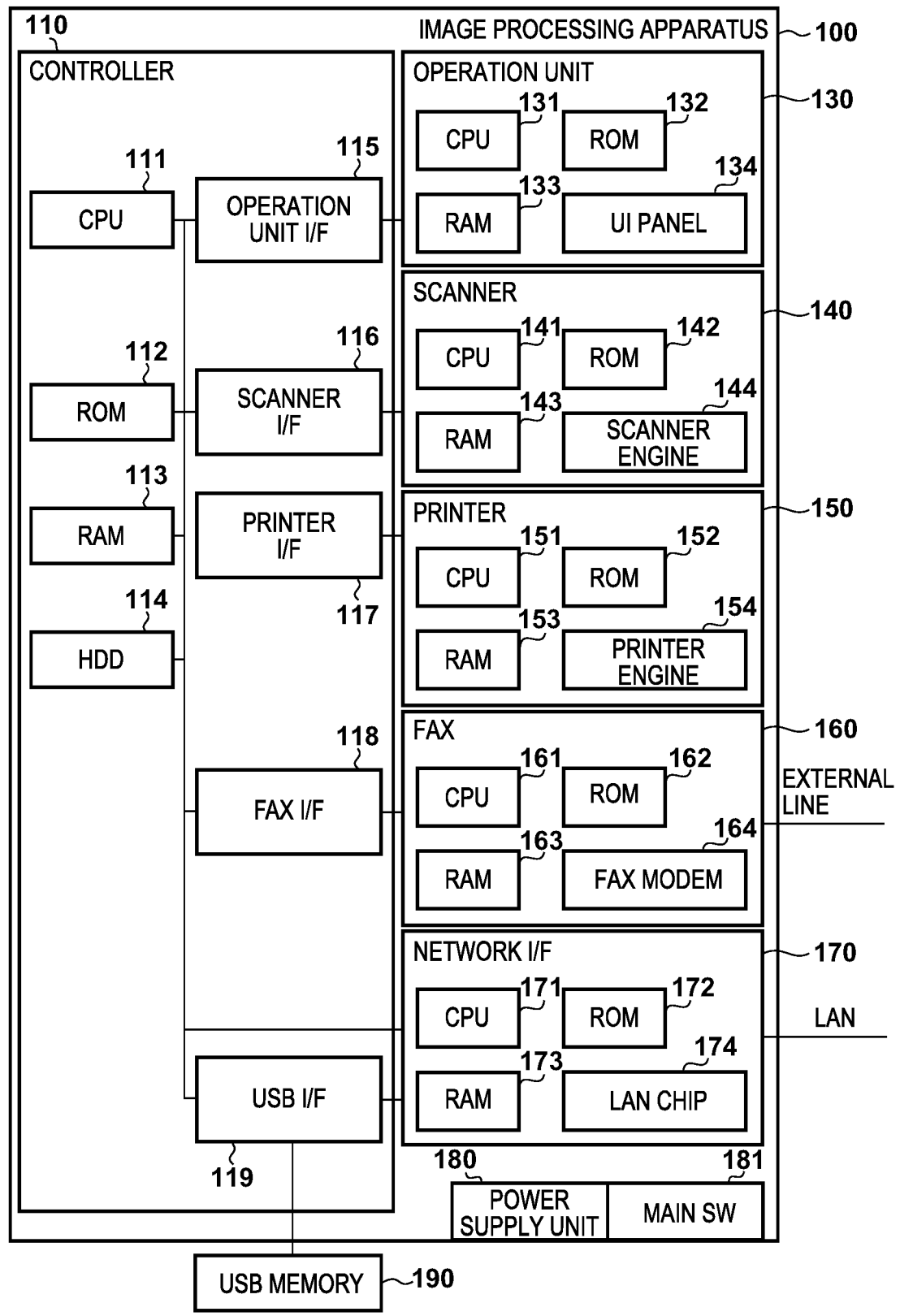
FIG. 1 is a block diagram of an image processing apparatus according to an embodiment.

A configuration of an image processing apparatus 100 according to the present embodiment will be described first with reference to FIG. 1. The image processing apparatus 100 includes the following units: an operation unit 130, a scanner 140, a printer 150, a FAX 160, a network I/F 170, and a controller 110. Reference numeral 180 denotes a power supply unit that supplies power to the entire image processing apparatus, and the image processing apparatus 100 is turned on and off by using a main switch 181.

Each unit includes a CPU, a ROM, and a RAM (volatile memory), and as a result of the CPU included in the unit executing firmware stored in the ROM, the function operation of the unit is realized. Also, in the RAM included in each unit, an operation log storage area to which the operation logs of firmware are written is allocated, and each piece of firmware writes operation logs to the operation log storage area in association with an operation. The operation logs written to the operation log storage area of the RAM are configured to be read from the RAM (volatile memory) and written to a non-volatile memory such as an HDD so as to be constantly stored in the HDD through processing for storing operation logs in a non-volatile area, which will be described later.

The configuration of each unit will be described next in detail. The operation unit 130 includes a CPU 131, a ROM 132, a RAM 133, and a UI panel 134, and is connected to the controller 110 via an operation unit I/F 115. The operation unit 130 accepts an input made by a user, transmits the input to the controller 110, starts the function operation of the image processing apparatus designated by the user, and displays the state of the image processing apparatus and a notification for the user transmitted from the controller 110 on the UI panel 134. The controller 110 is an example of a control unit. Also, a log storage operation, which will be described later, is executed by the controller 110. However, the present invention is not limited thereto, and the log storage operation may be performed by another processing unit, or a unit for executing the log storage operation may be provided separately from the controller 110. The configuration in which a unit for executing the log storage operation is provided separately is advantageous in that, even if the log storage operation cannot be executed due to an error that has occurred in the controller 110, the log storage operation can be executed by the separate unit. Also, the operation unit 130, the scanner 140, the printer 150, the FAX 160, and the network I/F 170 are examples of processing units. That is, the processing units are units that present the functions of the image processing apparatus.

The scanner 140 includes a CPU 141, a ROM 142, a RAM 143, and a scanner engine 144, and is connected to the controller 110 via a scanner I/F 116. The CPU 141 executes firmware stored in the ROM 142 so as to perform a scan operation of optically reading an original document using the scanner engine 144, and converting the read original document to electronic image data while communicating with the controller 110.

The printer 150 includes a CPU 151, a ROM 152, a RAM 153, and a printer engine 154, and is connected to the controller 110 via a printer I/F 117. The CPU 151 executes printer control firmware stored in the ROM 152 so as to form an image on a print medium based on the image data received from the controller 110 and provide a print-out, using the printer engine 154.

The FAX 160 includes a CPU 161, a ROM 162, a RAM 163, and a FAX modem 164, and is connected to the controller 110 via a FAX I/F 118. The CPU 161 executes FAX control firmware stored in the ROM 162 so as to control the FAX modem 164 while communicating with the controller 110, and also communicates with an external FAX apparatus via an external FAX line.

The network I/F 170 includes a CPU 171, a ROM 172, a RAM 173, and a LAN chip 174, and is connected directly to a data bus of the controller 110. The CPU 171 reads and executes network control firmware stored in the ROM 172, and performs network communication in accordance with a predetermined communication protocol via a LAN line.

The controller 110 is a control unit that performs overall control of the units that constitute the image processing apparatus 100 as a system, and includes a CPU 111, a ROM 112, a RAM 113, and an HDD 114 that is a non-volatile memory. The CPU 111 reads and executes controller firmware stored in the ROM 112 so as to communicate with the units to control the units, and to transmit and receive image data to and from the scanner 140, the printer 150, and the FAX 160. The CPU 111 also performs control so as to process an operation instruction from the user received by the operation unit 130 and cause the operation unit 130 to display the status of each unit. The controller firmware stored in the ROM 112 also includes firmware that realizes an operation log storage control unit, which will be described later.

Memory Map in RAM

Figure 2:
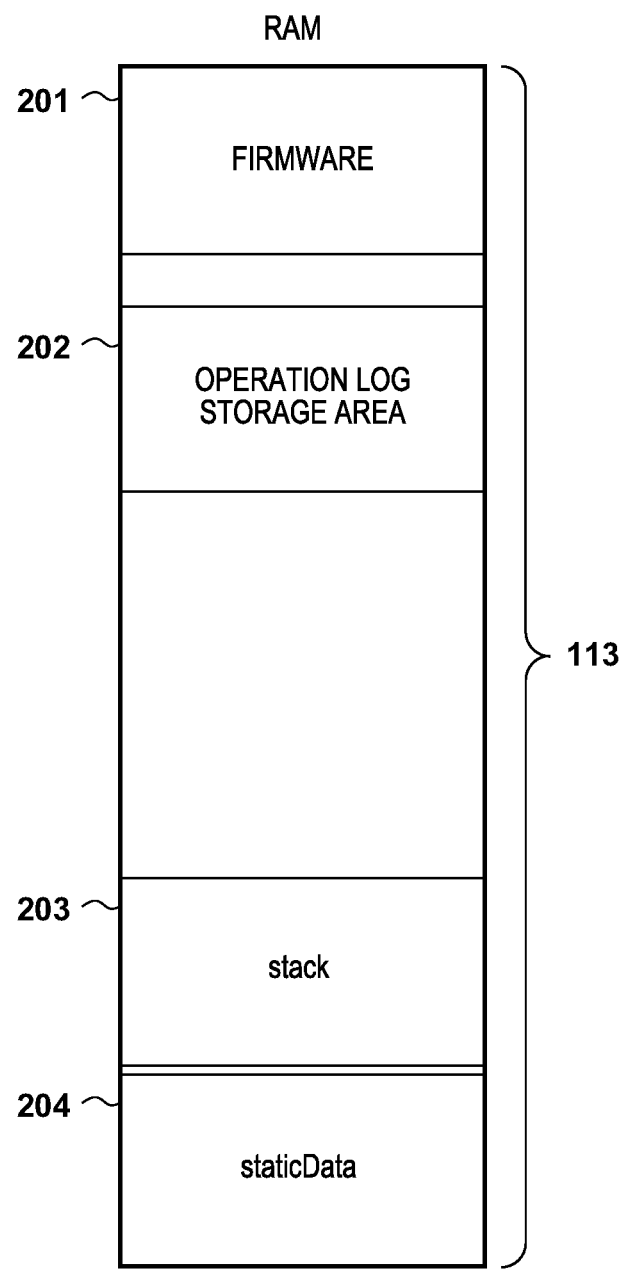
FIG. 2 is a diagram showing a data map stored in a RAM 113 according to an embodiment.

A memory map stored in the RAMS 133, 143, 153, 163, 173, and 113 of the units will be described next with reference to FIG. 2. The RAMs included in the units are physically separate pieces of hardware, and configured to have different storage capacities, but mapping in each RAM in terms of firmware has the same basic structure as shown in FIG. 2.

Each RAM includes areas 201 to 204 in which different data sets are stored. The area 201 is an area for storing firmware read from the ROM as needed. The area 203 is a stack area that is dynamically used by the firmware. The area 204 is a data area that is statically used by the firmware. The area 202 is an area to which the operation logs of the firmware are written during operation. The operation logs written to the area 202 are configured so as to be capable of being read, transferred to the controller 110, and eventually stored in the HDD 114.

Data Configuration of HDD

A configuration of main data stored in the HDD 114 will be described next with reference to FIG. 3. An area 301 (firm/) is an area in which the controller firmware is stored. The main body of the controller firmware is stored in the ROM 112, but is temporarily loaded to the HDD 114 in order to increase the operating speed. The area 301 is an area for the CPU 111 to read and execute the firmware loaded to the HDD 114. An area 310 (data/) is an area in which adjustment values specific to the scanner 140 and the printer 150 and user setting values for copy and print operations that are required by the controller firmware to execute various types of operations are stored.

An area 320 (tmp/) is an area in which data and a working file that are temporarily required when the controller firmware performs a control operation of the image processing apparatus 100 are stored, and is also used as a temporary work area during operation log storage, which will be described later. An area 330 (log/) is an area for constantly storing operation logs collected from each unit until the logs are collected after an error has occurred.

Figure 3:
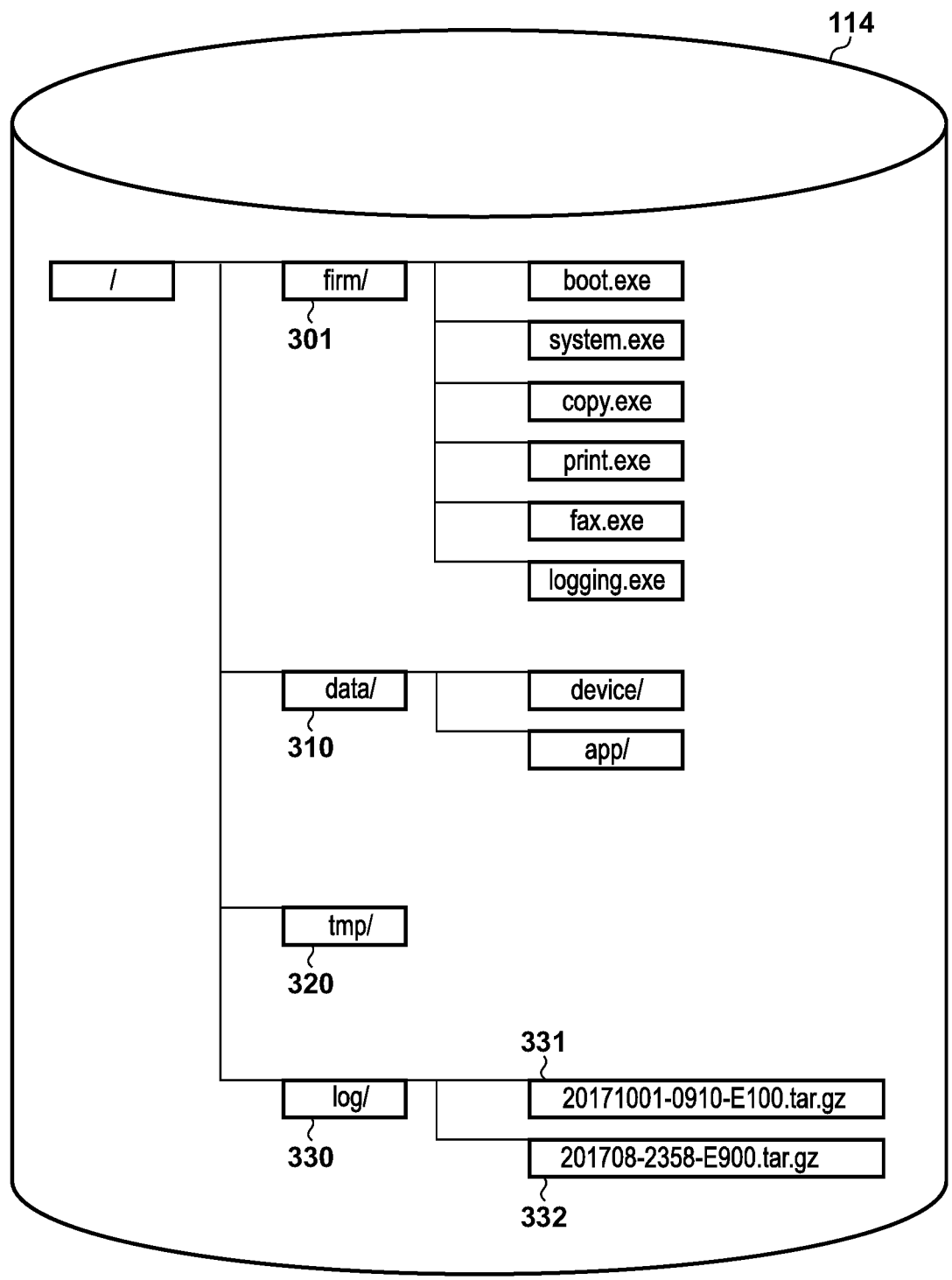
FIG. 3 is a diagram showing a data configuration of data stored in an HDD 114 according to an embodiment.

FIG. 3 shows an example in which a log archive 331 is stored in association with the occurrence of a printer error and a log archive 332 is stored in association with the occurrence of a FAX error. In these stored archive files, it is desirable that a character string indicating the date and time at which the archive file was stored and a character string indicating an error code are included in the file name.

Operation Log

Figure 4:
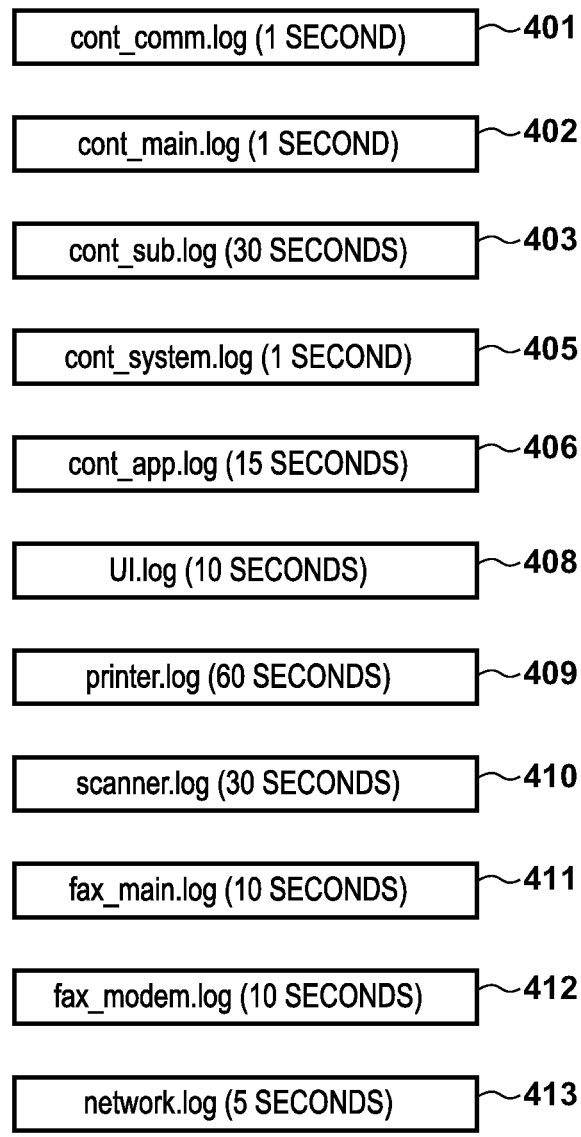
FIG. 4 is a diagram showing a list of all operation logs according to an embodiment.

A list of all operation logs in the image processing apparatus 100 will be described next with reference to FIG. 4. FIG. 4 is a list of logs in the order in which the logs are stored during the operation of collecting and storing all operation logs. The value within parentheses indicates the length of time required to transfer each operation log from the corresponding unit to the controller 110 and store the operation log in the HDD 114.

Reference numerals 401 (cont_comm.log), 402 (cont_main.log), 403 (cont_sub.log), 405 (cont_system.log), and 406 (cont_app.log) denote operation logs of the controller firmware. The operation logs 401 to 406 are written in the RAM 113 included in the controller 110 during operation of the image processing apparatus 100.

Reference numeral 408 (UI.log) denotes an operation log of the control firmware of the operation unit 130, and is stored in the RAM 133 of the operation unit 130. For this reason, in order to store the operation log 408 of the operation unit 130 in the HDD 114, it is necessary to first perform processing for transferring the operation log 408 from the operation unit 130 to the controller 110.

Reference numeral 409 (printer.log) denotes an operation log of the control firm of the printer 150, and is stored in the RAM 153 of the printer 150. Reference numeral 410 (scanner.log) denotes an operation log of the control firmware of the scanner 140, and is stored in the RAM 143 of the scanner 140. Reference numerals 411 (fax_main.log) and 412 (fax_modem.log) denote operation logs of the control firmware of the FAX 160, and are stored in the RAM 163 of the FAX 160. Reference numeral 413 (network.log) denotes an operation log of the control firmware of the network I/F 170, and is stored in the RAM 173 of the network I/F 170.

With respect to the printer operation log 409, the scanner operation log 410, the FAX operation logs 411 and 412, and the network operation log 413, it is also necessary to perform processing in which the operation logs are read out from the RAM of each corresponding unit and then transferred to the controller 110. In addition, the communication speed between each unit and the controller 110, and the log size of each operation log vary depending on the unit configuration, and thus, as shown in FIG. 4, the processing time required to store each operation log in the HDD is different.

Log Storage Operation

Figure 5A:
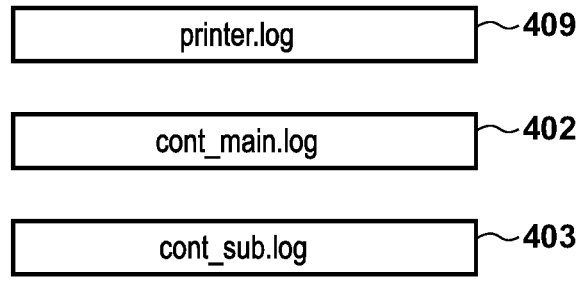
FIG. 5A is a diagram showing an example of logs stored when a printer error occurs according to an embodiment.
Figure 5B:
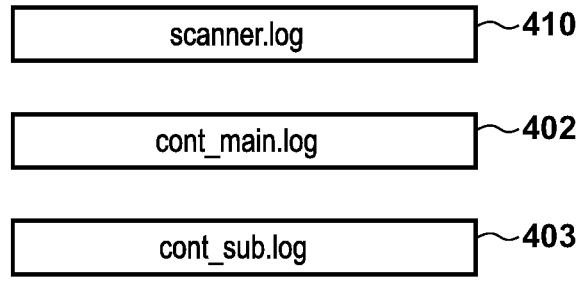
FIG. 5B is a diagram showing an example of logs stored when a scanner error occurs according to an embodiment.
Figure 5C:
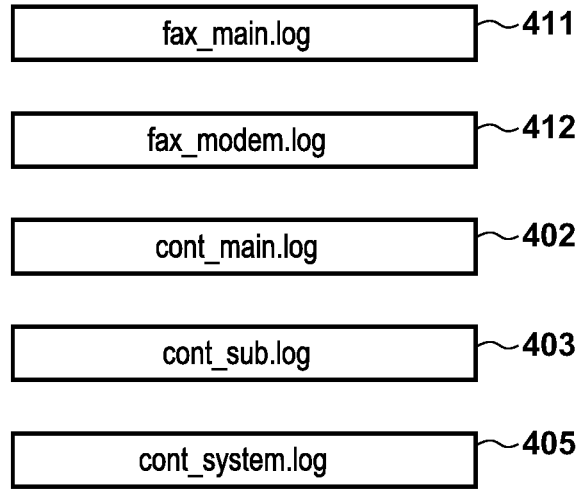
FIG. 5C is a diagram showing an example of logs stored when a FAX error occurs according to an embodiment.
Figure 5D:
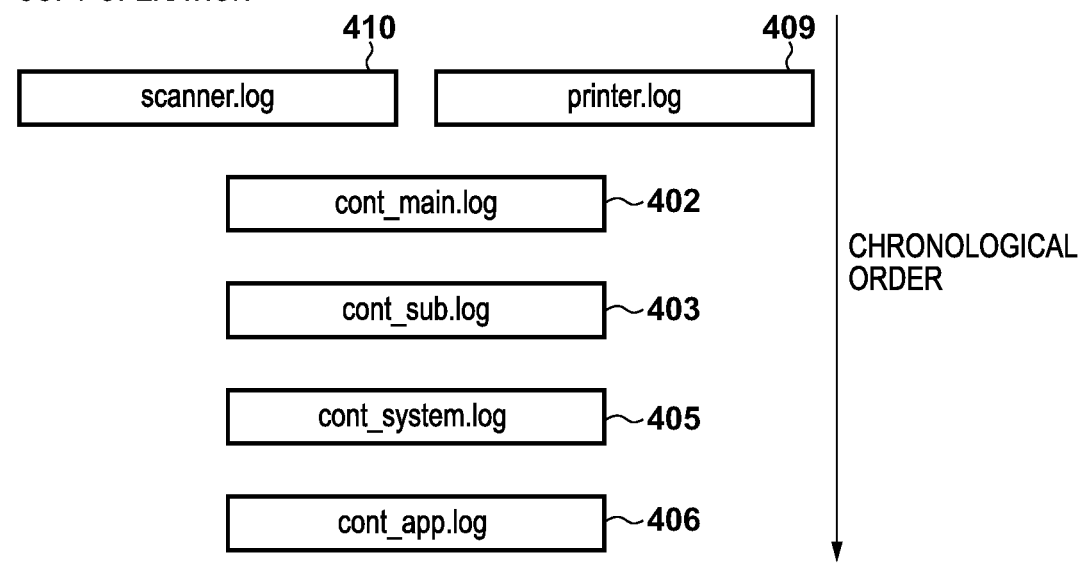
FIG. 5D is a diagram showing an example of logs stored when a copy operation error occurs according to an embodiment.
Figure 6:
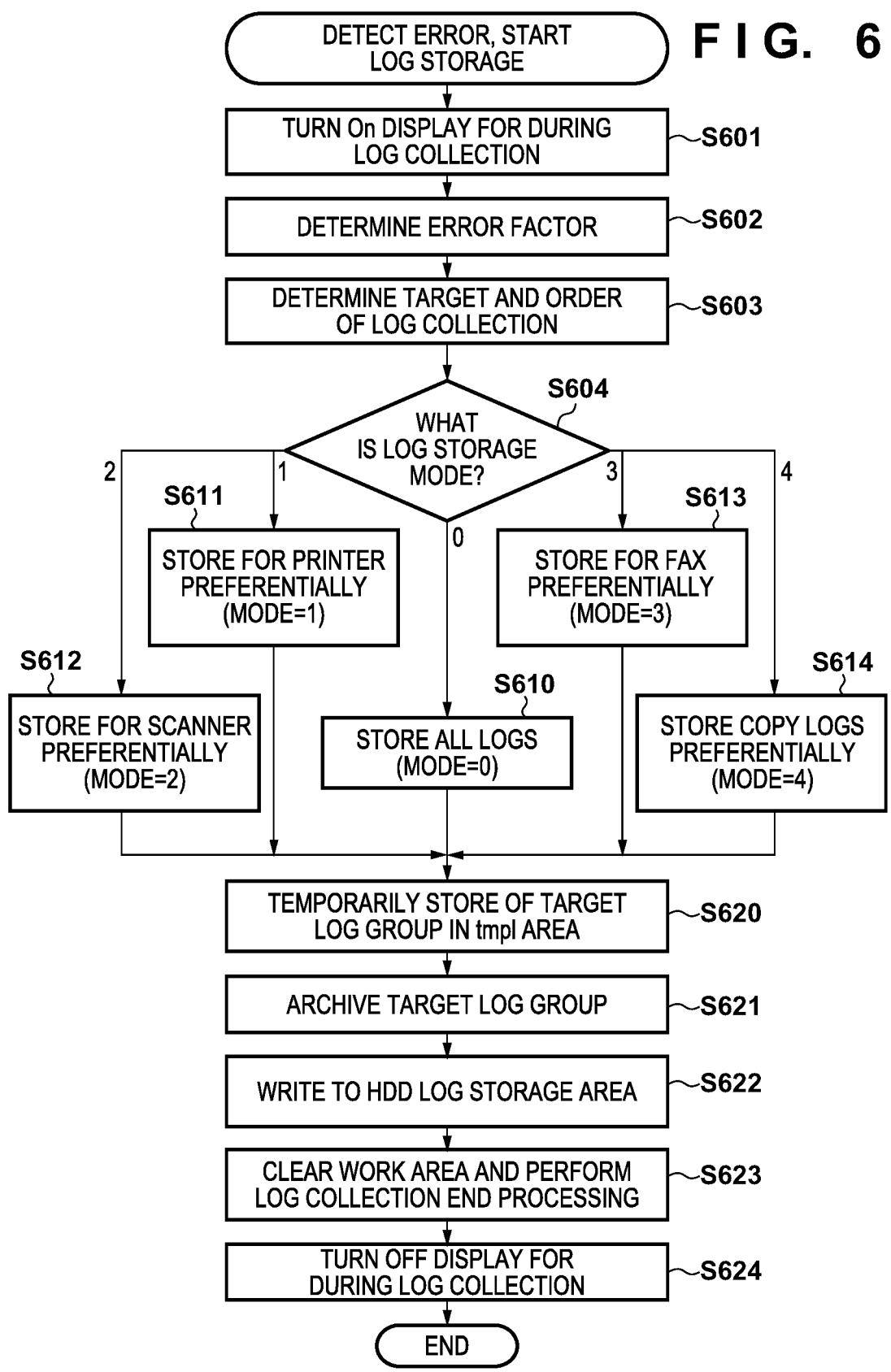
FIG. 6 is a flowchart of log storage processing according to an embodiment.

A log storage operation according to the type of error will be described next with reference to FIGS. 5A to 7. The processing shown in the flowchart in FIG. 6 is started upon detection of a failure in any one of the units or an anomaly in firmware in the image processing apparatus 100. The processing described below is performed by the CPU 111 of the controller 110 executing log storage control processing, which is a part of the controller firmware, and communication processing with each unit.

Figure 7:
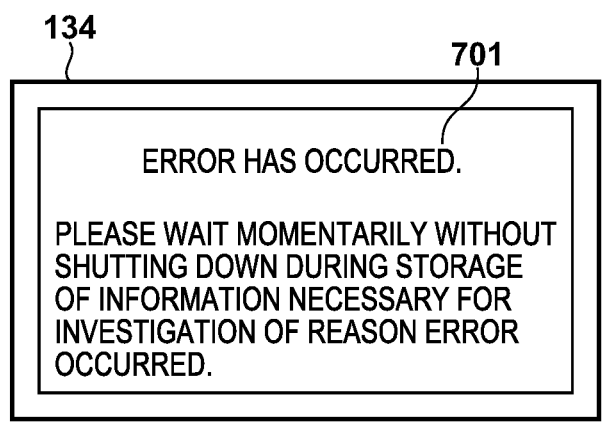
FIG. 7 is a diagram showing an example of display of a UI screen displayed while logs are stored according to an embodiment.

First, in step S601, in order to inform the user of the fact that logs are currently being collected, the CPU 111 transmits, to the operation unit 130, an instruction to display a UI screen 701 shown in FIG. 7 on the UI panel 134 so as to cause the operation unit 130 to display the screen. The UI screen 701 shows information indicating that an error has occurred, and a warning for the user to not shut down the image processing apparatus 100 because the error factor is currently being investigated, or in other words, operation logs are being stored.

Next, in step S602, the CPU 111 determines a unit that is relevant to the error factor. Specifically, the CPU 111 determines a unit from which it was notified of the error, or in other words, which of the operation unit 130, the scanner 140, the printer 150, the FAX 160, the network I/F 170, and the controller 110 issued the error. Then, in step S603, the CPU 111 determines the log storage mode, in which the type of logs that need to be collected and the order in which logs are collected are defined, based on the unit that is relevant to the determined error factor.

In the present embodiment, the following five log storage modes are used, and any one of the modes is selected to store logs:

mode 0: the operation logs of all units are stored;
mode 1: logs that are relevant to the printer unit are preferentially stored;
mode 2: logs that are relevant to the scanner unit are preferentially stored;
mode 3: logs that are relevant to the FAX unit are preferentially stored; and mode 4: logs of a copy operation are stored preferentially and in parallel.

As used herein, the expression "preferentially stored" refers to a method in which the operation logs of a unit of high priority are stored in sequence. Likewise, the expression "stored in parallel" refers to a method in which the operation logs of a plurality of units of high priority are stored in parallel. For example, in the copy operation, an error may occur in both the printer unit and the scanner unit, and thus the operation logs of the two units are stored in parallel.

Here, the mode 0 described above is a mode in which all operation logs in the image processing apparatus 100 shown in FIG. 4 are stored. The mode 1 is a mode in which, as shown in FIG. 5A, the printer operation log 409, which is required to analyze a printer error, is first stored, and then the relevant controller operation logs 402 and 403 are stored. The mode 2 is a mode in which, as shown in FIG. 5B, the scanner operation log 410, which is required to analyze a scanner error, is first stored, and then the relevant controller operation logs 402 and 403 are stored. The mode 3 is a mode in which, as shown in FIG. 5C, FAX operation logs 411 and 412, which are required to analyze a FAX error, are first stored, and then the relevant controller operation logs 402, 403, and 405 are stored. The mode 4 is a mode that is selected according to an error that occurred during a copy operation, and because an error in the copy operation may be relevant to both the scanner and the printer, as shown in FIG. 5D, the printer operation log 409 and the scanner operation log 410 are simultaneously collected and stored in the controller 110. Furthermore, in the mode 4, after these operation logs have been collected and stored in the controller 110, the relevant controller operation logs 402, 403, 405, and 406 are collected and stored.

In step S604, the CPU 111 determines the selected log storage mode, and branches to any one of the operation log storage operations in steps S610, S611, S612, S613, and S614 according to the selected mode. In the units whose operation logs are to be collected, the CPU of each unit performs processing of reading operation logs from the operation log storage area 202 of the RAM and transferring the operation logs to the controller 110. In step S610, the CPU 111 stores the operation logs of each unit, and the processing advances to step S620. In step S611, the CPU 111 preferentially stores the operation logs of the printer 150, and the processing advances to step S620. In step S612, the CPU 111 preferentially stores the operation logs of the scanner 140, and the processing advances to step S620. In step S613, the CPU 111 preferentially stores the operation logs of the FAX 160, and the processing advances to step S620. In step S614, the CPU 111 preferentially stores the operation logs of the scanner 140 and the printer 150, and the processing advances to step S620.

In step S620, the CPU 111 receives, from each unit, operation logs that are to be collected and stored in each mode, and stores the operation logs in the temporary storage area 320 (tmp/) in the HDD. Then, the CPU 111 archives the operation logs collected in the temporary storage area 320 (tmp/) in step S621 into one file, and, in step S622, stores the file in the final storage area 330 (log/). Furthermore, in step S623, the CPU 111 cleans up the temporary data and the work area as post-processing of the set of log storage processing operations. Finally, in step S624, the CPU 111 hides the UI screen 701 indicating that log storage processing is currently being performed, and terminates the log storage processing. The logs stored in the storage area 330 can be collected from the image processing apparatus 100 by reading out the logs from the HDD 114 and storing them in a USB memory, as a result of attaching a USB memory 190 after the logs have been stored, and can be used in the necessary analysis.

As described above, the image processing apparatus according to the present embodiment includes a plurality of units each holding individual operation logs. The image processing apparatus detects an error that has occurred in the image processing apparatus, decides a unit which obtains operation logs from among the plurality of units and an order in which the operation logs are obtained, according to the type of the detected error, and stores the operation logs in a non-volatile memory based on the decided order. With this configuration, even in an image processing apparatus including a plurality of pieces of firmware, it is possible to preferentially store operation logs that are required to perform fault investigation.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-252069 filed on Dec. 27, 2017, which is hereby incorporated by reference herein in its entirety.

What is claimed is:

1. An image processing apparatus controlled by a plurality of firmware, the apparatus comprising:
a non-volatile storage configured to store information;
at least one controller configured to function as:
a unit that executes a first storage process for storing a plurality of operation logs in the non-volatile storage in response to occurrence of a first error, wherein in the first storage process, the operation logs of a first firmware are stored in the non-volatile storage before the operation logs of a second firmware; and a unit that executes a second storage process for storing a plurality of the operation logs in the non-volatile storage in response to occurrence of a second error, wherein in the second storage process, the operation logs of the second firmware are stored in the non-volatile storage before the operation logs of the first firmware.

2. The image processing apparatus according to claim 1, wherein
the plurality of firmware correspond to a plurality of hardware provided in the image processing apparatus, respectively.

3. The image processing apparatus according to claim 2, wherein
one of the plurality of hardware is a hardware in which the controller is provided.

4. The image processing apparatus according to claim 2, wherein
one of the plurality of hardware is a scan device.

5. The image processing apparatus according to claim 2, wherein
one of the plurality of hardware is a print device.

6. The image processing apparatus according to claim 2, wherein
one of the plurality of hardware is a facsimile device.

7. The image processing apparatus according to claim 1, wherein
the first error is an error related to the first firmware.

8. The image processing apparatus according to claim 1, wherein
the controller determines a storing order of the operation logs to be stored in the non-volatile storage based on a type of an occurred error.

9. The image processing apparatus according to claim 8, wherein
The type of the occurred error is identified with an error code.

10. The image processing apparatus according to claim 1, further comprising a display device configured to display information,
wherein the controller, upon detecting the occurrence of error, causes the display device to display a warning for a user to not shut down the image processing apparatus because operation logs are being stored due to the occurrence of error.

11. The image processing apparatus according to 10, wherein
The controller causes the display device to hide the warning when the storing of the operation logs to the non-volatile storage is terminated.

12. A control method for controlling an image processing apparatus controlled by a plurality of firmware, the apparatus comprising a non-volatile storage, the method comprising:
executing a first storage process for storing a plurality of operation logs in the non-volatile storage in response to occurrence of a first error, wherein in the first storage process, the operation logs of a first firmware are stored in the non-volatile storage before the operation logs of a second firmware; and
executing a second storage process for storing a plurality of the operation logs in the non-volatile storage in response to occurrence of a second error, wherein in the second storage process, the operation logs of the second firmware are stored in the non-volatile storage before the operation logs of the first firmware.

13. The control method according to claim 12, wherein
the plurality of firmware correspond to a plurality of hardware provided in the image processing apparatus, respectively.

14. The control method according to claim 13, wherein
one of the plurality of hardware is a hardware in which the controller is provided.

15. The control method according to claim 13, wherein
one of the plurality of hardware is a scan device.

16. The control method according to claim 13, wherein
one of the plurality of hardware is a print device.

17. The control method according to claim 13, wherein
one of the plurality of hardware is a facsimile device.

18. The control method according to claim 12, wherein
the first error is an error related to the first firmware.

19. The control method according to claim 12, wherein
the controller determines a storing order of the operation logs to be stored in the non-volatile storage based on a type of an occurred error.

20. A non-transitory computer-readable storage medium storing program for causing a computer to execute steps of a control method for controlling an image processing apparatus controlled by a plurality of firmware, the apparatus comprising a non-volatile storage, the control method comprising:
executing a first storage process for storing a plurality of operation logs in the non-volatile storage in response to occurrence of a first error, wherein in the first storage process, the operation logs of a first firmware are stored in the non-volatile storage before the operation logs of a second firmware; and
executing a second storage process for storing a plurality of the operation logs in the non-volatile storage in response to occurrence of a second error, wherein in the second storage process, the operation logs of the second firmware are stored in the non-volatile storage before the operation logs of the first firmware.

* * * * *